United States Patent

Lochner et al.

[11] Patent Number: 4,518,513
[45] Date of Patent: * May 21, 1985

[54] PASTY DAMPING MEDIUM METHOD FOR PREPARING AND USING SAME

[75] Inventors: Kaspar Lochner, Munich; Helmut Schürmann, Dachau; Erich Brand, Munich, all of Fed. Rep. of Germany

[73] Assignee: Schiedel GmbH & Co., Munich, Fed. Rep. of Germany

[*] Notice: The portion of the term of this patent subsequent to Nov. 22, 2000 has been disclaimed.

[21] Appl. No.: 585,463

[22] Filed: Mar. 2, 1984

Related U.S. Application Data

[62] Division of Ser. No. 441,513, Nov. 3, 1982.

[51] Int. Cl.$^3$ .................. C04B 43/00; C10M 5/04
[52] U.S. Cl. .................. 252/62; 252/25; 252/28; 252/56 R; 252/57; 181/294
[58] Field of Search .................. 252/25, 28, 56, 57, 252/62; 181/294

[56] References Cited

U.S. PATENT DOCUMENTS

| | | | |
|---|---|---|---|
| 3,713,851 | 1/1973 | Cekada, Jr. | 252/28 |
| 4,039,143 | 8/1977 | Brown, Jr. et al. | 252/28 |
| 4,416,790 | 11/1983 | Schurmann et al. | 252/28 |

Primary Examiner—Jacqueline V. Howard
Attorney, Agent, or Firm—Armstrong, Nikaido, Marmelstein & Kubovcik

[57] ABSTRACT

The pasty damping medium is used to damp mechanical and/or acoustic osciallations. The agent contains as a minimum compound a solid finely divided substance or a mixture of solid finely divided substances, as a liquid phase, a silicone oil, a polyglycol, a mineral oil and/or a saturated aliphatic or aromatic aliphatic carboxylic acid ester, an agent for increasing the interfacial surface activity or a surfactant, a finely divided magnesium and/or aluminium silicate and/or a silicon dioxide finely divided as a viscosity stabilizer and possibly a small quantity of an antioxidant. The invention concerns also a method for producing the pasty damping medium and the use of the pasty damping medium in different hydraulic damping devices or for industrial shock absorber or industrial vibration damper.

12 Claims, 2 Drawing Figures

PASTY DAMPING MEDIUM METHOD FOR PREPARING AND USING SAME

This is a division of application Ser. No. 441,513, filed Nov. 3, 1982.

DESCRIPTION

The invention relates to a pasty damping medium for damping mechanical and/or acoustic vibrations, based on a liquid phase and at least one finely-divided solid material.

Damping media for damping mechanical vibrations are known. Hydraulic oils, for example, have been suggested as damping media. However, these oils have the disadvantage that the heat formed when the damping medium is subjected to permanent load cannot be dissipated quickly enough, so that the oils become overheated and either foam or decompose.

Use has also been made of silicone oils containing hardening additives. These damping media undergo hardening under sudden load. Because of their limited flow properties, these dilatant damping media can only be used, however, for a few special damping processes. Damping media which harden also have the disadvantage of not possessing any noise-insulating property.

The U.S. Pat. No. 3,812,937 describes a damping medium for hydraulically-operating car shock absorbers. It consists of a low-viscosity petroleum oil, contains up to 20% by weight of an organophilic aminomontmorillonite that is prepared by reacting montmorillonite with an aliphatic amino salt, and contains acetonitrile.

The known hydraulic oil is a thickened oil which is not, however, suitable for damping high-frequency vibrations or for permanent loads because it is not able to dissipate the heat resulting from shock and/or tensile loads quickly enough. The petroleum oil starts to decompose at temperatures as low as about 82° C., while the viscosity of the damping medium is already considerably reduced at temperatures below 82° C.

The invention was therefore based on the object of providing a damping medium which can be manufactured from cheap and available basic materials without the thermal stability of the viscosity of the damping medium and hence the latter's flow properties and storage stability being impaired.

The object is established by means of a damping medium of the sort described at the beginning, which is characterized by the features of claims 1, 2 and 3.

Surprisingly, it was found that the graphite used as solid material in known damping media can be replaced by various other selected solid materials, even if these exhibit a different type of structure and particle arrangement or packing. The additve of the solid materials listed in claims 1 and 2 has the advantage that through selection of the respective solid material (solid materials), the damping medium can be adapted exactly for the desired damping operation or damping element, and that in the case of the pastes according to the invention the desired storage stability and the desired small change in viscosity with changing temperature are obtained. This is apparently due to a synergistic interaction between the special solids and the other components of the damping medium when given proportions prevail. The synergistic effect may possibly be based on the fact that the solids found have a high specific surface area and accordingly high surface activity. The viscosity of the damping medium according to the invention is particularly stable with changing temperature, and the stability of the pastes when stored or used in dampers is also good. There is no separating out or precipitating of any components of the mixture in the damping media of the invention, even when the media are stored for long periods or are subjected to high pressure loads. Surprisingly, high storage stability prevails also in damping media which contain a mixture of light-coloured or graphite-free solids and graphite. There is apparently a stabilizing effect in action here, which may be caused by mutual adherence of the solid materials. Processing of light-coloured solids does not pose any environmental problems, and the danger of pollution is much less than when graphite is used as the only solid.

If a silicone oil is used as basic material for the liquid phase, the viscosity of the silicone oil should preferably be at least 100 to 2000 mm$^2$/s at 25° C., in particular 200 to 1000 mm$^2$/s at 25° C. Methyl and/or methyl phenyl silicone oils have proved particularly useful. If silicone oil is used as liquid phase, it is not necessary to add a wetting agent or agent to improve the inherent viscosity. There is apparently an interparticular effect in action between the silicone oil of low surface tension and the added solid, which is highly surface-active. Suitable solids in this context are, in particular, ZnS, CaF$_2$, aluminium phosphate, aluminium polyphosphate and/or calcium phosphate; these solids may also have graphite mixed with them. If ZnS is used as the basic solid material, mixed with one of the other above-mentioned solids, the ratio of ZnS to the other solid is generally about 2:1. When used in shock- and vibration absorbers, the above-cited silicone pastes have approximately constant damping power (linear), also under constant load at about 20° to 150° C.

If a polyglycol is used as basic material for the liquid phase, the viscosity of the polyglycol should preferably be at least 20 mm$^2$/s at 50° C., in particular 20 to 200 mm$^2$/s at 50° C. It is preferable to use polyglycol ethers and/or esters which are either insoluble or only very slightly soluble. If polyglycol ethers or polyglycol ether mixtures of medium viscosity are used, the viscosity is about 70 to 90 mm$^2$/s, especially 80 mm$^2$/s at 50° C. If highly viscous polyglycol ethers or polyalkylene glycol ethers are used, the viscosity is about 170 to 200 mm$^2$/s, in particular 180 mm$^2$/s at 50° C. A preferably used polyalkylene glycol ether is for example the polyglycol ether LB 1800 (Union Carbide). The polyglycols used in the invention have a solidification point between about −50° C. and 0° C., in particular between −40° C. and −10° C., a relatively average molecular weight of about 700 to 20,000, in particular about 1,100 to 3,800.

Polyglycols with an average molecular weight of about 1,100 to 2,300 are especially preferred.

Use can also be made, however, of hydrophilic polyethylene, polypropylene and polybutylene glycols and mixtures thereof, as well as branched polyglycols and polyglycols derived from glycerine.

Suitable polyglycol ethers are for example the polyethylene glycol monoethylethers, propylethers, butylethers and pentylethers, the polypropylene glycol monomethylethers, ethylethers, propylethers, butylethers and pentylethers, and the polybutylene glycol monomethylethers, ethylethers, propylethers, butylethers, pentylethers and hexylethers and mixtures thereof.

The monoesters of the polyglycols can also be used, in particular the monoesters and diesters of the stearic, oleic and lauric acids of the aforementioned polyglycols.

The liquid phase can also comprise a saturated aliphatic ester, for example the ester of a saturated, aliphatic monohydric or polyhydric $C_5$–$C_{12}$ alcohol with saturated aliphatic $C_5$–$C_{12}$ monocarboxylic acids. The di- and triesters of saturated aliphatic carboxylic acid esters are particularly preferred. Suitable aromatic diesters are the esters of aliphatic, saturated monohydric or polyhydric $C_5$–$C_{12}$ alcohols with phthalic acid, terephthalic acid and isophthalic acid. Suitable aromatic triesters are the esters of aliphatic, saturated monohydric or polyhydric $C_5$–$C_{12}$ alcohols with benzene tricarboxylic acids. The following esters are examples of esters which have proved particularly suitable: esters of pentaerythrite, of trimethylol propane, and of trimethyl propanol with straight-chain or branched $C_5$–$C_{12}$ carboxylic acids, the esters of adipic acid, such as adipic acid octyldecylester, and their derivatives, the esters of the glutaric and/or pimelic acids, the esters of the phthalic acids, such as diethylhexyl phthalate, dioctylphthalate, diisotridecyl phthalate, didecyl phthalate, and esters of the trimellitic acids, trimesine acids and/or hemillitic acids, for example tridecyl- and trioctyl esters of the trimellitic acids.

The liquid phase has added to it, in particular, a graphite-free solid. The solids make up 20 to 80% by weight, preferably 30 to 70% by weight, based on the total weight of the damping medium. If there is less than 20% by weight of solid material, the damping medium has too low a viscosity, so that it can hardly be used as an effective damping medium. If more than 80% by weight of solid material is used the resulting substance is so firm that the flow property is impaired. The preferred range for the solid additives is between about 30 and 60% by weight, based on the total weight of the damping medium. Suitable solids are finely-divided ones which have a favourable effect on the intrinsic viscosity of the damping medium. These include aluminium oxide, aluminium hydroxide, aluminium carbonate, aluminium phosphate, aluminium polyphosphate, aluminium silicate, cryolite, barium sulfate, calcium carbonate, magnesium oxide, magnesium carbonate, magnesium silicate, magnesium aluminium silicate, magnesium stearate, lithium stearate, molybdenum sulfide, silicon dioxide, sillimanite, titanium dioxide, zinc sulfide, zinc pyrophosphate, talcum, kaolin and/or polytetrafluor ethylene. A particularly suitable solid is ZnS, possibly in combination with $AlPO_4$, $Al_5(P_3O_{10})_3$ or $CaF_2$.

The particle size of the light-coloured solids is at a maximum 10 μm for 80% of the particles. It is preferable if 80% of the solid particles measure less than 5 μm, in particular if 80% measure less than 3 μm. The fine degree of division of the solid particles is an essential feature of the paste according to the invention, since, besides the other factors, it contributes to the colloidal stability of the paste.

The advantageous use of light-coloured solids will now be explained in more detail with reference to the most important of these solids.

ZnS and $CaF_2$ exhibit good lubricity and good thermal stability, so that the damping medium of the invention will also exhibit good lubricity and good thermal stability if prepared using these components. Kaolin has very good thickening properties, which means that the total proportion of solid material can be reduced while at the same time the damping medium is capable of a high degree of energy conversion. Calcium carbonate as solid additive disperses very well, as a result of which the working properties of the damping medium are improved.

The use of aluminium oxide increases the thermal stability of the damping medium. By using zinc sulfide as solid additive the pressure resistance of the damping medium according to the invention can be increased and, in addition, the solid materials are caused to disperse better. This is especially important if a mixture of solids is used.

Barium sulfate is a very cheap and completely inert raw material, and is therefore particularly suitable for the production of rubber-compatible damping media. Molybdenum sulfide is used as additive especially if the lubricity and maybe the dispersing quality of the solid materials are to be improved. Even small quantities of molybdenum sulfide improve the lubricity of the damping medium effectively. Molybdenum sulfide is used especially in conjunction with aluminium oxide, CaF, ZnS, cryolite or graphite.

Titanium oxide is used especially if the damping medium is to be lightened considerably and should not affect rubber parts. The titanium dioxide should preferably be at least 99% pure.

The paste-like damping media according to the invention have a viscosity of about 100000 to $4 \times 10^6$ mPa s, in particular of about 150000 to $3 \times 10^6$ mPa s at 18° C.

According to a development of the invention the solid materials can also be surface-treated. Some of the solids employed are preferably used in silanized form.

The light-coloured solids can be replaced in part by natural or electrographite, the particle size of preferably 80% of which is less than 10 μm, in particular less than 3 μm. The light-coloured solids can be replaced up to 50% by weight, in particular 40% by weight, by graphite. The solid mixture preferably contains 5% to 35% by weight graphite if also graphite is used as solid.

The wetting agents, or agents for improving the interfacial surface activity, are added in quantities of, in particular, 0.5–2% by weight, based on the total weight of the damping medium. Use is made in particular of the amino salts of oleic acid, linoleic acid, palmitic acid and/or stearic acid. Organic compounds containing perfluoroalkyl groups are particularly effective wetting agents, for example fluoridated alkylpolyoxyethylene ethanol. Further suitable wetting agents are tallow fatty acid diamine, coconut fatty acid diamine, naphthalene sulfonate, alkyl aryl sulfonate, especially alkyl benzene sulfonate, fatty alcohol polyglycol ether and ethoxylated acetylene alcohols. The purpose of the wetting agents is to improve the wetting of the solids used with the liquid phase. When silicone oil is used as liquid phase, a wetting agent is generally not required. This does not imply that silicone oils and wetting agents are generally incompatible, and special wetting agents can if necessary be used too.

It is advantageous to add to the damping medium according to the invention agents which stabilize the intrinsic viscosity, namely 1 to 7, in particular 2 to 4% by weight, based on the total weight of the damping medium, of Al- and/or Mg silicate and/or silicon dioxide in finely divided form. Microdispersed silicic acid, asbestos and Ca- and Na-bentonites are especially suitable. Bentonite is preferably worked in the presence of an activator such as propylene carbonate, acetone or acetonitrile. The viscosity stabilizers have a grain size of less than 0.5 μm, more especially 0.1 μm.

It is not necessary to add an agent for improving the intrinsic viscosity if silicone oil is used as liquid phase and silicon dioxide, or one of the other solids mentioned above, as solid.

In order to stabilize the liquid phase against oxidation at increased temperatures, the damping medium according to the invention, which contains esters or glycoles as liquid phase, preferably contains 0.1 to 4, in particular 0.5 to 3% by weight based on the total weight of the damping medium, of an antioxidant. Suitable antioxidants are, for example, phenol and thiophenol compounds of the type described in Ullmann's Enzyklopädie, Vol. 15, pages 217 to 220. Sterically hindered amino and phenol derivatives, for example the diphenyl amine, phenyl-α-naphthyl amine, thiophenyl amine, alkyl phenols, di-tertiary-butyl-p-cresol or trimethyl diheterochinoleine are especially suitable.

When using carboxylic acid esters as liquid phase it is advantageous to employ a polymeric viscosity improver to improve the viscosity index and to adjust the viscosity of the liquid. The viscosity improvers are polymers which are soluble, partly soluble or at least disperse very well in the saturated aliphatic or aromatic carboxylic acid esters. Suitable viscosity improvers for the damping media according to the invention are e.g. polyisobutylenes, polymethacrylates, polybutadienes, polybutenes, polypropylenes, polyethylenes and/or polystyrols.

The aforementioned viscosity improvers are preferably added in a quantity of 0.5 to 5, in particular 0.5 to 2% by weight, based on the total weight of the damping medium, When using polyglycols or silicone oils as liquid phase, it is generally not necessary to employ a viscosity improver because these compounds are available over the corresponding viscosity ranges. However, this does not exclude the possibility of employing additional viscosity improvers in special cases. Here too the viscosity improvers are added in a quantity of about 0.5 to 5% by weight, in particular 0.5 to 2% by weight, based on the total weight of the damping medium.

The damping media according to the invention are prepared by starting with the liquid phase and first mixing it with the wetting agent and the antioxidant, if these are to be used. Thereafter, at a temperature between 40° and 100° C., preferably 60° and 80° C., the agent for stabilizing the intrinsic viscosity—if needed—is stirred in, stirring being continued until homogeneous distribution has been attained. Following this, the light-coloured solids or mixture of light-coloured solids and graphite are added little by little at a constant rate. While mixing in the solid additives the temperature is preferably kept between 60° and 80° C. If the solid additives are not sufficiently finely divided, stirring or mixing can be performed with simultaneous grinding. Mixing and/or grinding of the damping medium is preferably carried out under vacuum so as to avoid air being stirred into the damping medium. Suitable stirring devices include for example dispersing machines and kneading machines such as double-action kneading machines, three-roller mills and planetary mixers. Mixing takes 20 to 120 minutes, depending on the mixing efficiency of the stirrer. A homogeneous, storage-stable paste is obtained. Even when stored for several months, there is no sedimentation of the solid(s).

The damping media according to the invention are suitable for hydraulically-operating damping devices, especially as media for engine bearings, wheel dampers, impact absorbers, steering dampers, shock absorbers, devices for rail vehicles and aeroplanes, vibration absorbers of all kinds, seat dampers and for vibration-free bedding of machines.

Figure 1:
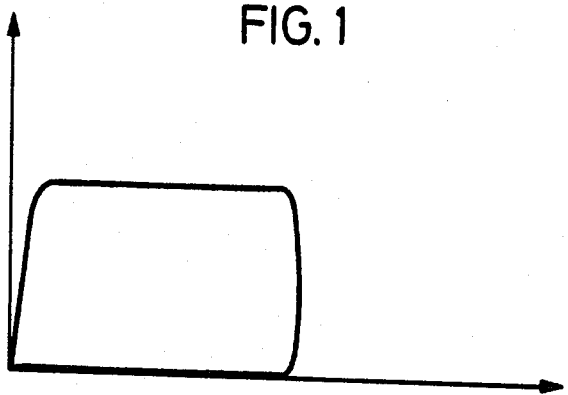
FIGS. 1 and 2 show a force-distance diagram for impact test to determine damping properties.

The invention is described in more detail by means of the following examples.

EXAMPLE 1

A homogeneous damping medium was prepared by mixing the carboxylic acid ester with the wetting agent and the antioxidant. The intrinsic viscosity stabilizer was then added at 60° and after stirring for some 20 minutes the solid additives were mixed in. The composition of the damping medium is summarized in the following Table:

|  | Wt. % |
|---|---|
| Trimethyl propane adipic acid octyldecyl ester | 50 |
| Graphite (particle size < 0.8 μm) (solid) | 16 |
| Zinc sulfide (solid) | 30 |
| Fluorinated alkyl polyoxyethylene ethanol (wetting agent) | 1 |
| Amorphous silicon dioxide (particle size < 0.1 μm) | 2 |
| Diphenyl amine (antioxidant) | 1 |

In a further test the above ester was replaced by trimethyl adipic acid didecyl ester. In the "Sieb" Test (sieve test) (DIN 51817=German Industrial Standard 51817), both damping media showed an oil separation of less than 1% after 24 hours at 100° C.

EXAMPLE 2

A damping medium was prepared according to the method of Example 1, with the following composition:

|  | Wt. % |
|---|---|
| Polyglycol monobutyl ether (viscosity 80 mm$^2$/s at 50° C.) | 50 |
| Graphite (particle size < 3 μm) | 14 |
| ZnS | 32.5 |
| Alkyl polyoxyethylene ethanol (fluorinated) (wetting agent) | 0.5 |
| Phenyl-α-naphthylamine (antioxidant) | 1 |
| Bentonite* with propylene carbonate as activator) | 2 |

*Propylene carbonate content: 0.5% by weight

EXAMPLE 3

A damping medium was prepared according to the method of Example 1, with the following composition:

|  | Wt. % |
|---|---|
| Polyglycol monobutyl ether (viscosity 80 mm$^2$/s at 50° C. | 50 |
| Graphite (particle size < 3 μm) | 41.8 |
| Tetrafluor ethylene (particle size < 5 μm) | 4.7 |
| Fluorinated alkyl alkoxylate (wetting agent) | 0.5 |
| Bentonite* with propylene carbonate as activator | 2 |
| Trimethyl dihetero-chinoleine (antioxidant) | 1 |

*Propylene carbonate content: 0.5% by weight

EXAMPLE 4

A damping medium according to the invention was prepared was prepared as in Example 1, with the following composition:

|  | Wt. % |
| --- | --- |
| Didecyl azelate | 32.8 |
| Zinc sulfide (solid) grain size < 2 μm | 46 |
| Graphite (particle size < 3 μm) | 16.7 |
| Alkyl polyoxyethylene ethanol | 0.3 |
| Di.-tert. butyl-p-cresol | 0.4 |
| Bentonite (Bentone) with 20% propylene carbonate as activator | 1.8 |
| Polymethylacrylate (viscosity improver) | 2 |

EXAMPLE 5

A homogeneous paste was prepared by carefully stirring and kneading the solids into a silicone oil of certain viscosity. The composition of the damping medium is summarized below:

|  | Wt. % |
| --- | --- |
| Dimethyl polysiloxane (viscosity 350 m$^2$/s) | 31.5 |
| ZnS (particle size < 2 μm) | 42.0 |
| CaF$_2$ (particle size < 2 μm) | 26.5 |
| Penetration (DIN* 51804): 260 to 280 · 0.1 mm | |
| Oil precipate (DIN* 51817 but heated over 24 h to 100° C.) | 0.2 |

(* = German Industrial Standard)

EXAMPLE 6

A damping medium was prepared as in Example 5, having the following composition:

|  | Wt. % |
| --- | --- |
| Dimethyl polysiloxane (viscosity 350 m$^2$/s) | 36.0 |
| Graphite (particle size < 3 μm) | 14.0 |
| ZnS (particle size < 2 μm) | 50.0 |
| Penetration (DIN 51804): 260 to 280 · 0.1 mm | |
| Oil precipitate (DIN 51817 but heated over 24 h to 100° C.) | 0.5 |

EXAMPLE 7

A damping medium was prepared as in Example 5, having the following composition and properties:

|  | Wt. % |
| --- | --- |
| Dimethyl polysiloxane (viscosity 350 m$^2$/s) | 40.4 |
| ZnS (particle size < 2 μm) | |
| Aluminium phosphate (AlPO$_4$.2H$_2$O) with high specific surface area | 21.1 |
| Penetration (DIN 51804): 260 to 280 · 0.1 mm | |
| Oil precipitate (DIN 51817 but heated over 24 h to 100° C.) | 0.2 |

PRACTICE-RELATED EXAMPLE

The damping medium according to the invention (e.g. according to Example 4) was filled into a hydraulically-operating impact damper comprising two concentric pipes, the inner of which formed the piston and the outer the cylinder. The inner pipe is filled with nitrogen, which is separated by a cross piston from the piston bottom behind. There is a hole in the bottom of the piston. The damping medium is in the cylinder space behind the piston bottom and is forced through the hole in the inner pipe when the latter is pushed on impact into the outer pipe. On entering the inner pipe, the damping medium pushes the cross piston back and compresses the nitrogen. The elastic power of the gas causes the two pipes to reassume their starting positions after the impact has ended. Projecting into the hole in the bottom of the piston there is a control pin. This control pin is of conical shape, the cone being produced in steps of about 1/10 mm. The further the pin penetrates into the hole, the smaller is the gap through which the damping medium can flow. In this way it is possible to obtain a power increase towards the end of the damping stroke.

Due to the viscosity of the damping medium according to the invention it is possible to have larger tolerances in the damping device than is the case in conventional series dampers with hydraulic oil. The damping medium does not foam at high pressure differences and has a flashpoint of more than 300° C.

The impact damper was fixed to the front of a motor vehicle weighing 475 kg.

Figure 2:
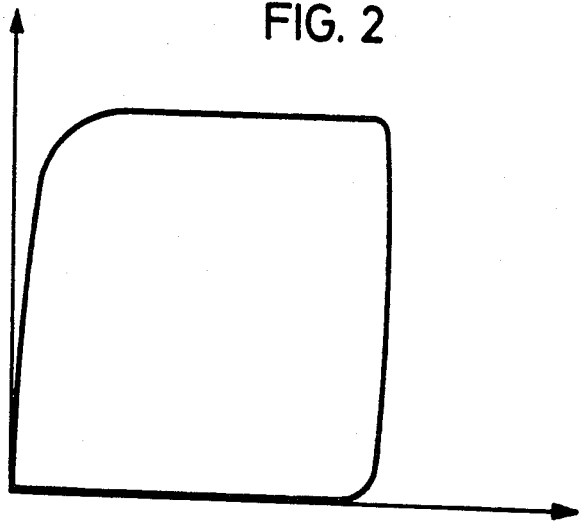

In order to determine the length of the compression stroke an inductive distance sensor was attached firmly to the vehicle and connected with the tip of the impact damper. An acceleration sensor was also attached to the vehicle in order to determine the vehicle retardation. Several impact tests were carried out, under the following test conditions:

Vehicle weight 450 kg; impact speed 5.3 km/h
Vehicle weight 475 kg; impact speed 7.9 km/h The force-distance diagram for the above impact tests is almost rectangular, indicating optimal damping properties. The entire kinetic energy of the vehicle is taken up by the damper and the available damping distance (stroke) optimally used (see FIGS. 1 and 2). FIG. 1 shows the force-distance diagram for the impact test with a load of 450 kg at 5.3 km/h while FIG. 2 shows the impact test with a load of 475 kg at 7.9 km/h.

Even at impact speeds of up to 10 km/h the damper is fully effective. The vehicle retardation (vehicle weight 500 kg) is 9.8 g and thus well under the retardation values for standard impact dampers filled with hydraulic oils. Considerably more energy is taken up by the impact damper filled with the damping medium of the invention than in the case of standard impact dampers.

While standard dampers filled with hydraulic oil only convert part of the impact energy and store the remainder like a spring that subsequently decelerates the vehicle, impact dampers filled with the damping medium according to the invention dissipate practically all the kinetic energy resulting from the impact. The vehicle is not decelerated.

We claim:

1. A pasty damping medium for damping mechanical and/or acoustic vibrations, comprising, as a liquid phase, a member selected from the group consisting of polyglycols and saturated aliphatic or aromatic carboxylic acid esters stable to temperature fluctuation, and about 20 to 80% by weight based on the total weight of the damping medium of particles of a solid selected from the group consisting of aluminum oxide, aluminum silicate, aluminum phosphate, aluminum polyphosphate, cryolite, calcium phosphate, calcium fluoride, magnesium oxide, magnesium silicate; magnesium aluminum silicate, molybdenum sulfide, silicon dioxide, sillimanite, titanium dioxide, zinc sulfide and zinc pyrophosphite, at least 80% of said particles having a particle size of less than 10 μm.

2. The damping medium of claim 1 further comprising 0.1 to 4% by weight based on the total weight of the damping medium of a wetting agent.

3. The damping medium of claim 2 comprising 0.5 to 2% by weight based on the weight of the damping medium of the wetting agent, the wetting agent being selected from the group consisting of an amino salt of oleic acid, an amino salt of linoleic acid, an amino salt of palmitic acid, an amino salt of stearic acid, tallow fatty acid diamine, coconut fatty acid diamine, naphthalene sulfonate, alkyl aryl sulfonate, fatty alcohol polyglycol ether, an ethoxylated acetylene alcohol, an alkyl compound containing a perfluoroalkyl group, a fluoridated alkylpolyoxyethylene ethanol, a potassium fluoroalkyl carboxylate and/or a fluoridated alkyl ammonium iodide.

4. The damping medium of claim 1 wherein the solid comprises 30 to 70% by weight based on the total weight of the damping medium.

5. The damping medium of claim 1 wherein at least 80% of said particles are less than 5 μm.

6. The damping medium of claim 1 wherein at least 80% of said particles are less than 3 μm.

7. The damping medium of claim 1 further comprising 0.1 to 4% by weight based on the weight of the damping medium of an antioxidant for said polyglycol or carboxylic acid ester, said antioxidant being selected from the group consisting of a sterically hindered alkyl phenol, a thiophenol or a dialkyl selenide.

8. The damping medium of claim 7 comprising 0.5 to 3% by weight of said antioxidant.

9. The damping medium of claim 7 or claim 8 wherein said antioxidant is selected from the group consisting of diphenyl amine, phenol-α-naphthyl amine, methylene-4,4'-bis-(2,6-ditertiary butyl phenol), thiophenyl amine, ditertiary butyl-p-cresol and trimethyl dihetero-chinoleine.

10. The damping medium of claim 1 further comprising 0.5 to 5% by weight based on the weight of the damping medium of a viscosity improver selected from the group consisting of polyisobutylene, polymethyl methacrylate, polybutene, polybutadiene, polyethylene polypropylene and polystyrol.

11. The damping medium of claim 1 further comprising an intrinsic viscosity stabilizer selected from the group consisting of calcium bentonite, sodium bentonite, asbestos and finely-dispersed silicic acid.

12. The damping medium of claim 1 wherein said solid is selected from the group consisting of zinc sulfide, calcium fluoride, aluminum phosphate and calcium phosphate.

* * * * *